May 15, 1923.
C. E. LANG
WELL FISHING TOOL
Filed March 5, 1921
1,455,499
2 Sheets-Sheet 1
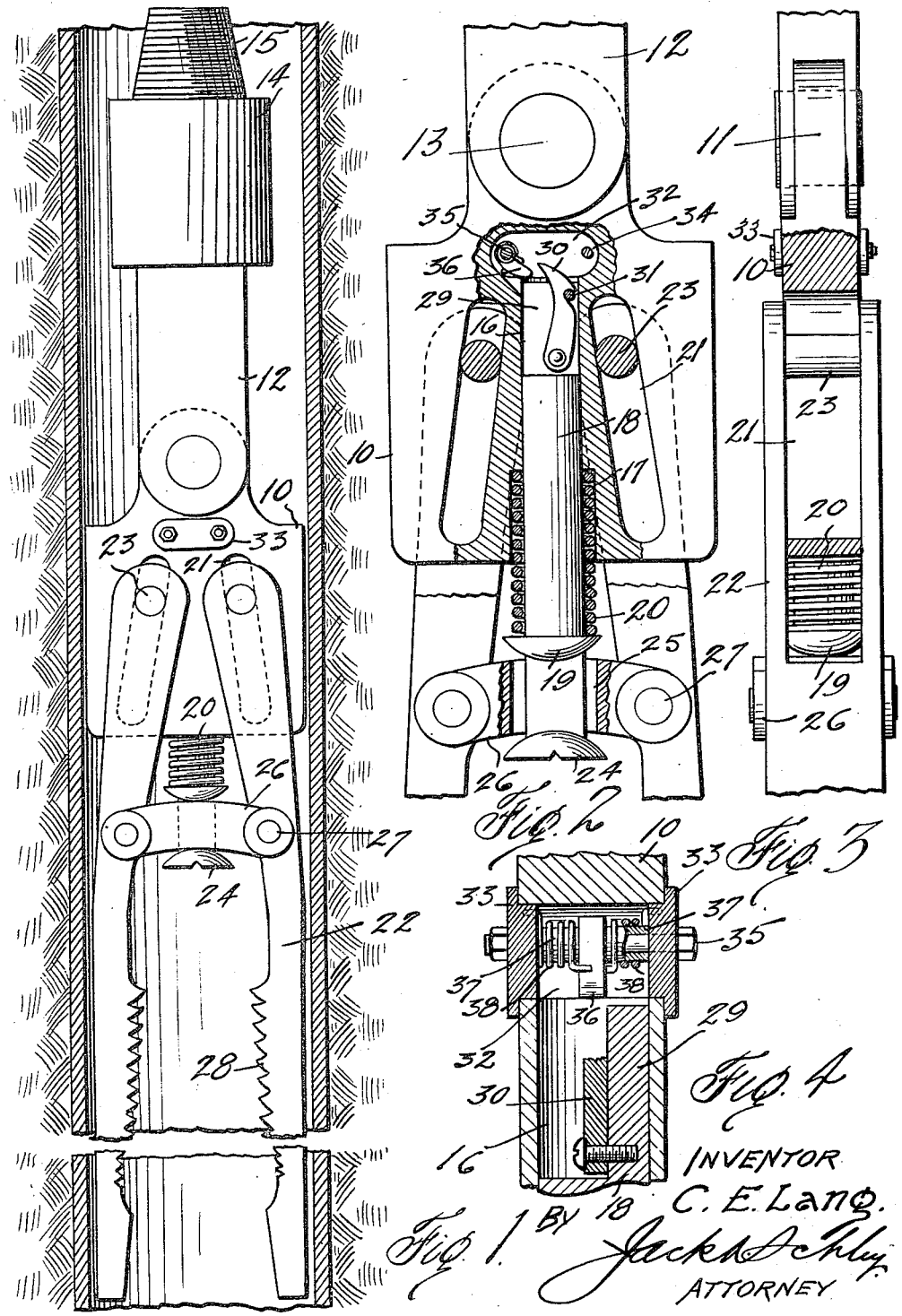

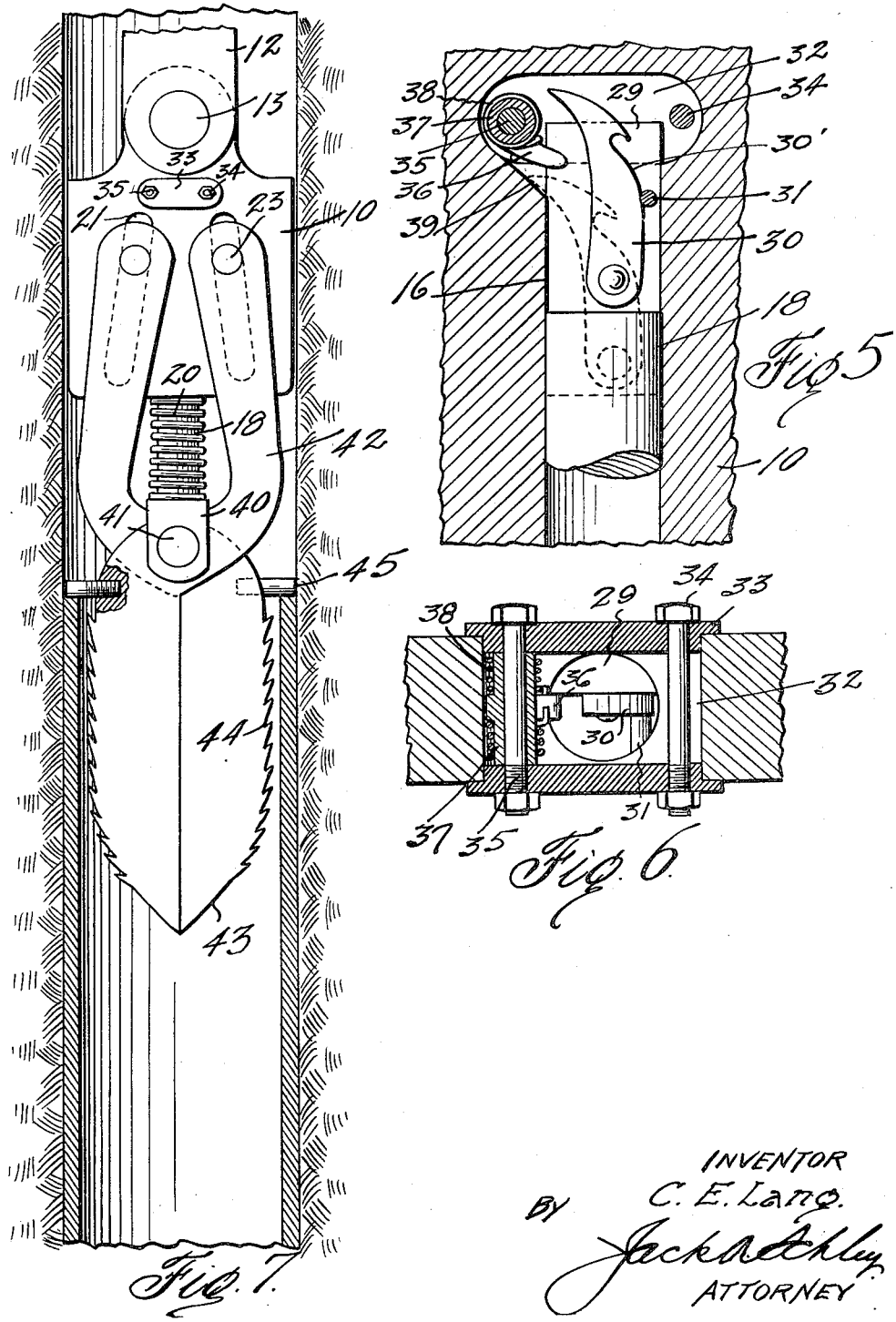

Patented May 15, 1923.

1,455,499

UNITED STATES PATENT OFFICE.

CHARLES E. LANG, OF WICHITA FALLS, TEXAS.

WELL FISHING TOOL.

Application filed March 5, 1921. Serial No. 450,044.

*To all whom it may concern:*

Be it known that I, CHARLES E. LANG, a citizen of the United States, residing at Wichita Falls, in the county of Wichita and State of Texas, have invented certain new and useful Improvements in Well Fishing Tools, of which the following is a specification.

This invention relates to new and useful improvements in well fishing tools.

The object of the invention is to provide a fishing tool structure of a highly efficient type and arranged to operate either external or internal grabbing members, thus providing a universal tool which may be used for any kind of a fishing operation. A further object is to provide a tool which will be substantial so that it can be jarred upon if necessary.

One of the essential features of the invention resides in a head having diverging slots and a spring pressed plunger provided with a latch for holding it elevated in the head and under tension. Coacting with the foregoing are a pair of grabbing members pivotally mounted on the plunger and having connections engaging in the slots, whereby said members are swung to engage the work when the latch is released and the plunger extended, whereby the connections riding down the diverging slots swing said members. Another feature resides in the provision for retracting the members and the plunger and latching said plunger so that the grabbing members may be disengaged and the tool withdrawn from the hole in case it is impossible to remove the obstruction.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a vertical sectional view of a well casing showing a tool constructed in accordance with my invention in elevation, and equipped with external grabbing members.

Fig. 2 is a detail in front elevation, having a portion broken away to illustrate underlying parts, Fig. 3 is a side elevation, parts being in section, Fig. 4 is a vertical sectional detail, Fig. 5 is a detail of the latching device, Fig. 6 is a cross-sectional detail of the latching means, and Fig. 7 is a view similar to Fig. 1, showing the device equipped with internal grabbing members.

In the drawings the numeral 10 designates a rectangular head having a reduced ear 11 at the center of its upper end. The ear engages in the lower slotted end of a shank 12 and is pivoted on a pin 13 passing therethru. The shank 12 has an enlarged collar 14 at its upper end which is surmounted by a tool joint connection 15 of the usual construction. In the center of the head is provided an annular bore 16 which has an enlarged counter bore 17 at its lower end. A plunger 18 is received in the bore and has a convex collar 19 at its lower end presenting a flat surface or shoulder around and supporting the lower end of a coiled spring 20 which is received in the counter bore 17.

On each side of the bore 16 a diverging slot 21 is provided in the head, said slots diverging downwardly. A pair of grabbing members 22 have jaws at their upper ends receiving the head 10 and each provided with a cross pin 23 engaging in the slot 21. These pins may be of any approved construction, and details have not been illustrated. At the lower end of the plunger a convex head 24 is provided and that portion of the plunger lying between the convex portions of the collar 19 and the head 24 is angular in cross section so as to prevent the plunger from rotating in the slot 25 of a cross link 26. The link has its end slotted to receive the members 22 which are pivoted therein on pins 27. It will be seen that the links may rock freely on the convex surfaces, so that the members 22 may be carried up and down evenly or one in advance of the other. The members 22 have their lower ends wedge-shaped and are provided on the inner surfaces with teeth 28 directed inwardly for grabbing articles therebetween.

The upper end of the plunger 18 is cut back so as to provide a reduced lug 29. A latch hook 30 has its lower end pivoted to the flat side of the lug so that its overhanging point extends above the upper end of the plunger. When the plunger is elevated so that the pins 23 are near the upper ends of the slot 21 and the members 22 are expanded, the hook 30 engages over a pin 31 projecting into the bore 16 from the head 10. When the hook is engaged with the pin 31 its point extends up into a transverse recess 32 in the head. This recess is closed at each side by shouldered cap plates 33 connected by cross bolts 34 and 35 respectively.

On the bolt 35 a tripping dog 36 is pivoted and held in position by sleeves 37 surrounding said bolt on each side thereof. The dog is transversely alined with the latch 30 and is held in a neutral position by a pair of coiled springs 38 surrounding the sleeves 37 on each side of said dog and being oppositely coiled. Below the dog is an inclined slot 39 into which said dog may be depressed. The pin 31 is offset sufficiently from the center of the plunger so that the latch may engage the same by swinging to one side. The latch has a curved shoulder 30' just under its hook portion which rides against the pin 31 when the plunger is displaced upwardly, whereby the latch is displaced to the opposite side and being overbalanced remains in this position. The spring 20 when released will force the plunger downward. During this downward movement the upper end of the latch will strike the dog and swing the same down into the slot 39.

The plunger is released when the head 24 strikes an obstruction which assures that the article to be removed has been received between the lower ends of the members 22. It is pointed out that if one of the members 22 should strike upon an obstruction it may be forced upward and the link 26 swung without disengaging the latch. This is a very important feature because it precludes the unlatching of the plunger until the article to be fished is received between the members 22. When the latch hook 30 is released and the plunger 18 carried downwardly the pins 23 will be carried downwardly in the slots 21, and consequently the upper ends of the members 22 will be swung outwardly whereby their lower ends will be swung inwardly, thus causing the teeth 28 to bite into the article lying therebetween. An upward pull on the tool will, of course, tend to tighten the grip on the article to be fished. Should it be found impossible to dislodge the tool or other obstruction which is wedged in the well, it is, of course, desirable to remove the fishing tool and this may be easily accomplished. By lowering the head 10 or jarring upon the same the head 24 of the plunger being in contact with the tool will hold the parts, except the head, in a fixed position so that a relative movement of the pins 23 and the slot 21 will be had whereby the members 22 will be swung to disengage their lower ends from the obstruction. The dog 36 will engage with the pointed end of the hook 30 and as said dog is swung upwardly will force the hook toward the pin 31 and when the ends of the said dog ride off the ends of the hook, the latter will be sufficiently overbalanced to engage said end. The part will thus be latched and the tool may be withdrawn from the well.

To fish for hollow objects the plunger 18 is provided with a head 40 at its lower end carrying a pivot pin 41, as is shown in Fig. 7. Instead of the members 22, members 42 are employed and are crossed on the pin 41 so that when the upper ends of said members are swung outwardly, their lower ends will also be swung outwardly. The upper ends of the members are secured on the pins 23 and are constructed the same as the members 22. The lower end of each member 42 is beveled at 43 so that the members when swung together present a point. The outer edges of the lower portion of said members are provided with teeth 44 so as to engage within articles when said members are swung outwardly. The members 42 have laterally extending pins 45 just above the teeth 44. This is the only change made in the tool when fishing for hollow objects. It will be seen that in order to release the latch the pins 45 must engage upon the upper edge of the hollow article and the members must be within said article in order to displace the plunger upwardly. When the latch hook is released and the plunger extended the members 42 are swung outwardly so that the teeth 44 bite into the article being extracted. This form of a device operated in the same manner as that previously described.

Various changes in the shape and dimensions and modifications may be made without departing from the spirit of the invention.

What I claim, is:

1. In a fishing tool, a head having diverging slots, grabbing members having upper portions engaging in said slots, whereby said members are swung when moved vertically, a spring pressed plunger carried by said head relatively between said slots and to which said grabbing members are pivoted intermediate their ends, and means for holding said members retracted under tension of the spring pressed plunger arranged to automatically release said members and said plunger and to automatically latch when said parts are returned to their normal position.

2. In a fishing tool, a head having diverging slots, a spring pressed plunger mounted in the head, latch means for normally holding the plunger retracted, and grabbing members sustained by the plunger and having connections engaging in the slot for swinging said members when the plunger is released.

3. In a fishing tool, a head having diverging slots, a spring pressed plunger mounted in the head and normally retracted, grabbing members pivotally sustained on the plunger and having connections engaging the slots of the head, a latch hook carried by the plunger and engaging a part of the head and constructed to be displaced from said engagement when the plunger is moved upwardly.

4. In a fishing tool, a head having diverging slots, a spring pressed plunger mounted in the head and normally retracted, grabbing members pivotally sustained on the plunger and having connections engaging the slots of the head, a latch hook carried by the plunger and engaging a part of the head and constructed to be displaced from said engagement when the plunger is moved upwardly, and a tripping dog mounted in the head for displacing the latch hook into its latching position when the plunger is moved upwardly after having been released.

5. In a fishing tool, a head, a pair of swinging grabbing members slidable vertically relatively of the head, a spring pressed plunger carried by the head and pivotally connected with the members, and a latch engageable at the upper end of the plunger for fastening said plunger and grabbing members in a retracted position.

6. In a fishing tool, a head, a pair of swinging grabbing members slidable vertically relatively of the head, a spring pressed plunger carried by the head and pivotally connected with the members, and means in the head and co-acting with the plunger for normally holding the plunger and grabbing members retracted arranged to automatically release the parts upon an upward displacement of the plunger and subsequently to automatically latch the parts in retracted position when the plunger is again elevated.

7. In a fishing tool, a head, a pair of swinging grabbing members slidable vertically relatively of the head, a spring pressed plunger carried by the head and pivotally connected with the members, a latch carried by the plunger adapted to engage a stop in the head, and means for automatically throwing said latch into engagement with said stop when the plunger is elevated.

In testimony whereof I affix my signature.

CHARLES E. LANG.